(12) United States Patent
Schwedt et al.

(10) Patent No.: US 8,988,753 B2
(45) Date of Patent: Mar. 24, 2015

(54) OPTICAL FILTER DEVICE, IN PARTICULAR FOR MICROSCOPES

(71) Applicant: Carl Zeiss Microscopy GmbH, Jena (DE)

(72) Inventors: Daniel Schwedt, Weimar (DE); Jakow Konradi, Erfurt (DE)

(73) Assignee: Carl Zeiss Microscopy GmbH, Jena ( * ) Notice: Subject to any disclaimer, the term of this patent is extended or adjusted under 35 U.S.C. 154(b) by 0 days.

(21) Appl. No.: 14/039,117

(22) Filed: Sep. 27, 2013

(65) Prior Publication Data

US 2014/0092460 A1   Apr. 3, 2014

(30) Foreign Application Priority Data

Sep. 28, 2012 (DE) .......... 10 2012 019 472

(51) Int. Cl.
  *G02F 1/01* (2006.01)
  *G02B 21/00* (2006.01)

(52) U.S. Cl.
  CPC .......... *G02F 1/0136* (2013.01); *G02B 21/0092* (2013.01)
  USPC ....................................... 359/238

(58) Field of Classification Search
  USPC .............. 359/237, 238, 352, 634, 487.04
  See application file for complete search history.

(56) References Cited

U.S. PATENT DOCUMENTS

| | | | |
|---|---|---|---|
| 6,167,173 A | 12/2000 | Schoeppe et al. | |
| 7,605,976 B1 | 10/2009 | Wolleschensky | |
| 8,123,359 B2 * | 2/2012 | Maeda et al. | 353/20 |
| 2002/0097485 A1 | 7/2002 | Aoshima | |
| 2003/0169128 A1 | 9/2003 | Rauscher | |
| 2008/0049221 A1 | 2/2008 | Wolleschensky | |
| 2008/0062511 A1 | 3/2008 | Wolleschensky | |
| 2011/0068260 A1 | 3/2011 | Van Dijk et al. | |

FOREIGN PATENT DOCUMENTS

| | | |
|---|---|---|
| DE | 19702754 | 7/1998 |
| DE | 102005010581 | 9/2006 |
| DE | 10 2005 020 543 | 11/2006 |
| EP | 1520199 | 4/2005 |
| JP | 8114756 | 5/1996 |
| JP | 2001/056439 | 2/2001 |
| WO | WO 01/97321 | 12/2001 |

OTHER PUBLICATIONS

German search report dated Apr. 6, 2013.

* cited by examiner

*Primary Examiner* — Tuyen Tra

(74) *Attorney, Agent, or Firm* — Frommer Lawrence & Haug LLP

(57) ABSTRACT

An optical filter device having a polarizing beamsplitter, an achromatic polarization manipulator, and at least one dichroic mirror. The polarization manipulator is arranged optically between a first input/output of the polarizing beamsplitter and the dichroic mirror. The polarization manipulator is also constructed in such a way that it effects a 90-degree rotation of a polarization direction of light which a) exits the polarizing beamsplitter at the first input/output, b) traverses the polarization manipulator, c) is reflected by the dichroic mirror, and d) again traverses the polarization manipulator. The optical filter device can also be used as beamsplitter.

16 Claims, 3 Drawing Sheets

Fig. 1 — Prior Art

OPTICAL FILTER DEVICE, IN PARTICULAR FOR MICROSCOPES

The present application claims priority from German Patent Application No. DE 10 2012 019 472.2 filed on Sep. 28, 2012, the disclosure of which incorporated herein by reference in its entirety.

FIELD OF THE INVENTION

The invention is directed to an optical filter device, in particular for microscopes, having a polarizing beamsplitter.

It is noted that citation or identification of any document in this application is not an admission that such document is available as prior art to the present invention.

Optical filter devices are used for removing a partial spectral region (which can also consist of a plurality of separate bands) from a light beam. Within the meaning of the invention, the term "light" covers any electromagnetic radiation that can be manipulated by optical means, that is, in particular, ultraviolet radiation, visible radiation, and infrared radiation.

Dichroic mirrors are known from the prior art as optical filter devices. As in U.S. Pat. No. 6,167,173, they can be used, for example, in a fluorescence microscope as main color splitters for coupling the illumination beam path with the detection beam path (also known as "threading" the illumination beam onto the fluorescence beam). In so doing, different geometries are possible which have an effect on the suppression factor. Generally, dichroic mirrors have maximum selectivity and suppression at perpendicular incidence (0°). In this case, however, coupling of a plurality of beams (beam paths) is impossible so that an angle of incidence which deviates from 0° but which is as small as possible is selected in the prior art. Originally, an angle of incidence of 45° was used so that the illumination beam path and the detection beam path were arranged at 90° relative to one another. On the other hand, according to US 2008/0062511 A1, angles of incidence which are smaller but not equal to zero allow the partial spectral region that is to be removed to be suppressed to a greater extent in transmission. However, especially under these conditions a polarization splitting of the transmission spectrum occurs which has a disadvantageous effect on the suppression characteristics near the filter edges.

As a rule, dichroic mirrors designed as notch filters (with high selectivity, i.e., narrow-spectrum blocking range) are used as main color splitters (main beamsplitters). On the other hand, longpass filters or broad bandpass filters are used as emission filters in the (simple) detection beam path. Transmission and reflection are spectrally fixed in both cases. This is disadvantageous particularly in connection with spectrally adjustable or broad-band-emitting light sources, for example, so-called multiline lasers or white light lasers.

For this reason, optical filter devices which are variably adjustable with respect to the partial spectral region to be removed are particularly advantageous. They can be used for spectrally flexible illumination and/or for flexible separation of illumination light and sample light in that the partial spectral region to be removed is adapted to the respective desired illumination band. In fluorescence microscopy, the light coming from the sample (sample light) contains fluorescent light on one hand and reflected and scattered illumination light (excitation light) on the other hand. In different spectral excitation situations, only the excitation light in question may be filtered so as not to distort the measurement results. This applies in particular to the use of a suitable optical filter device as main color splitter.

An optical filter device which permits a limited variability of the light source is described, for example, in DE 102005010581 A1. In this case, a plurality of notch filters are arranged in a matrix on a holder which is slid into the correct positions. Alternatively, as in DE 19702754 A1, different filters are arranged on a wheel, which allows greater stability. Further, US 2002/0097485 A1 describes a filter device comprising a beamsplitter and a reflecting mirror. The beamsplitter is formed as a dichroic mirror having a plurality of regions with different filter characteristics. Displacement of the beamsplitter transverse to the light beam thus allows the characteristics of the main beamsplitter to be adapted to the illumination light. The suppression of the partial spectral region to be removed is relatively poor due to the angle of incidence of 45°.

Further spectrally flexible optical filter devices with polarizing beamsplitters are known from the prior art, for example, US 2008/0049221 A1 and U.S. Pat. No. 7,605,976 B1. The devices described therein can be used in a microscope either unidirectionally as spectrally flexible filters or bidirectionally as main color splitters. They require that the light to be manipulated be spatially spectrally split at a dispersive element and require a microstructured, variably adjustable polarization modulator whose resolution limits the spectral selectivity. Further, the suppression efficiency of these devices is limited by the polarization contrast which can be produced by the adjustable polarization modulator. This polarization contrast is currently 1:1000 so that a suppression of better than OD3 cannot be achieved in this way.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

It is the object of the invention to so improve an optical filter device of the type mentioned above which can be used as a main color splitter that a higher spectral selectivity and a greater suppression of the partial spectral region to be removed are made possible.

According to the invention, a (static, i.e., constantly working) achromatic polarization manipulator and a dichroic mirror are provided, wherein the polarization manipulator is arranged optically between a first input/output of the polarizing beamsplitter and the dichroic mirror and is constructed (and aligned) in such a way that it (effectively) rotates by 90° (relative to the polarization direction prior to the first passage) a polarization direction of light which a) exits the polarizing beamsplitter at the first input/output and b) traverses the polarization manipulator and c) is reflected by the dichroic mirror and d) traverses the polarization manipulator again (in the opposite direction). In particular, the polarization manipulator can be a retarder plate, for example, a quarter-wave plate.

This filter device which can be used as a main color splitter makes possible a (bidirectional) spectral filtering with a higher suppression and selectivity than in the prior art, since the dichroic mirror can be arranged in such a way that the light coming from the polarizing beamsplitter impinges on the dichroic mirror at an angle of incidence of 0°. This advantage becomes important particularly in a microscope in which the illumination beam path includes a light source for emitting a plurality of emission lines or a spectral region that is broader than an emission line.

The polarizing beamsplitter splits incident light into two polarization components which are orthogonal to one another and reflects one and transmits the other. Thus the transmitted polarization component of light entering at the opposite, third input/output and the reflected polarization component of light entering at the remaining fourth input/output can exit through the first input/output. The light to be filtered can be introduced into the third input/output or fourth input/output. The partial spectral region to be removed, insofar as it is contained, then exits at the other one of the two input/outputs. The remaining light exits behind the dichroic mirror.

It is generally advisable to use both polarization components. To this end, a further polarization modulator and, downstream thereof, a further dichroic mirror can be arranged in a corresponding manner at the second input/output of the polarizing beamsplitter, or the second polarization component is guided through the same polarization modulator and/or the same dichroic mirror as the first polarization component. As described, light components having wavelengths in the partial spectral region to be removed are reflected in both polarization components ("polarization branches") and combined at the polarizing beamsplitter and exit in the manner described above. The remaining reflected light (not reflected at the dichroic mirror(s)) can be detected separately, for example, in both polarization branches or can be brought together spatially by deflecting mirrors and/or a beamsplitter after the dichroic mirror(s).

The filter device according to the invention preferably comprises at least one second dichroic mirror, wherein the first dichroic mirror is arranged optically between the second dichroic mirror and the polarization modulator. The spectral blocking ranges of the two dichroic mirrors (arranged one behind the other) work cumulatively because light components having wavelengths in the rejected partial spectral region of the second dichroic mirror traverse the first dichroic mirror but are reflected at the second dichroic mirror. Accordingly, a plurality of spectral regions can be removed from the light to be filtered with high suppression and selectivity at the same time. This is advantageous especially in case of a multiline light source or white light source. Three or more dichroic mirrors with different blocking ranges are advantageously arranged one behind the other between the polarization modulators.

The dichroic mirror(s) can advantageously be formed as notch filters and/or edge filters and/or bandpass filters. This makes it possible to remove a plurality of excitation lines from the sample light with high suppression and selectivity. In particular, the final dichroic mirror (in the transmission direction of the light to be filtered before a possible reflection at one of the dichroic mirrors) can be formed as a bandpass filter. Accordingly, a separate emission filter in the (simple) detection beam path can be dispensed with.

The filter device according to the invention preferably comprises a second polarizing beamsplitter and a second (static) achromatic polarization modulator, wherein the dichroic mirror or dichroic mirrors is or are arranged optically between the first polarization modulator and the second polarization modulator, and the polarization modulators are arranged optically between the first input/output of the first polarizing beamsplitter and a first input/output of the second polarizing beamsplitter, so that light which a) exits from the first polarizing beamsplitter at the first input/output thereof and b) traverses both polarization modulators enters the second polarizing beamsplitter at a first input/output thereof. Therefore, both polarization components of the light to be filtered can be treated, which makes possible a maximum transmission efficiency of the filter device.

This embodiment is particularly advantageous in connection with a third polarization modulator and a fourth polarization modulator and at least one third dichroic mirror which is arranged optically between the third polarization modulator and the fourth polarization modulator, wherein these polarization modulators and the third dichroic mirror are arranged in such a way that light which a) exits from the first polarizing beamsplitter at a second output thereof and b) traverses the third polarization modulator and c) traverses the third dichroic mirror and d) traverses the fourth polarization modulator enters the second polarizing beamsplitter at a second input/output thereof. In this embodiment, as was described above, the one polarization component of the light to be filtered is filtered at the first dichroic mirror, and the other polarization component is filtered in a corresponding manner at the third dichroic mirror. In this way, the filter device achieves a maximum transmission efficiency.

In so doing, the first polarization manipulator and the third polarization manipulator can be identical. Alternatively or in addition, the second polarization manipulator and the fourth polarization manipulator can be identical. Alternatively or in addition, the first dichroic mirror and the third dichroic mirror can be identical. The same polarization manipulator or mirror, respectively, must then be arranged in both branches (polarization components) of the device. The quantity of optical elements needed is reduced in this way.

The quantity of optical elements needed can also be reduced in that the first polarizing beamsplitter and the second polarizing beamsplitter are identical and every light beam that has passed through the first polarization modulator and the second polarization modulator enters the polarizing beamsplitter so as to be (parallely) offset relative to its immediately preceding exit from the polarizing beamsplitter. A filter device with an offset of this kind is described, for example, in U.S. Pat. No. 7,605,976, the disclosure of which is incorporated herein in its entirety. Correspondingly, it may be advisable that the first polarization manipulator and the second polarization manipulator are identical.

Embodiment forms comprising a drive for displacing a dichroic mirror, particularly parallel to the surface thereof and/or transverse to an optical axis of a polarization modulator, particularly in two different directions perpendicular to one another, are particularly advantageous. In this way, different areas of the dichroic filter can be moved into the beam paths in order to vary the spectral filtering. It is advantageous when the dichroic mirror in question can be displaced into a position in which light which a) exits from the first input/output of the first polarizing beamsplitter and b) passes through the first polarization modulator runs past the dichroic mirror in question before it impinges on another dichroic mirror or on the second polarization modulator. In this way, for example, one (or generally a strict subset) of a plurality of dichroic mirrors can be rendered inoperative, while the rest remain operative. Thus, for example, an individual excitation line or a group of excitation lines can be removed through selective reflection.

Embodiments in which the displaceable dichroic mirror has different spectral filter characteristics at different locations, particularly with a spectral filter characteristic which varies continuously along the mirror surface, are particularly preferable. The filter effect can accordingly be adjusted in a flexible manner. The dichroic mirror can advantageously be formed as variable notch filter, for example, as in US 2002/0097485 A1, JP 8114756, US 2003/0169128 A1, JP 2001056439 or WO 01/97321 A1. Particularly when there is a plurality of dichroic mirrors which are arranged one behind the other and which each have different spectral filter characteristics at different locations, the flexibility of the filtering can be increased owing to the large number of possible combinations created in this way.

Such dichroic mirrors which vary from area to area are particularly advantageous when they differ from area to area along a first direction and differ from area to area along a second direction orthogonal to the first direction.

As was described above, embodiment forms in which the first dichroic mirror (preferably all dichroic mirrors) is arranged in such a way that the light which a) exits from the first polarizing beamsplitter at the first input/output thereof and b) traverses the first polarization modulator impinges on the first dichroic mirror at an angle of incidence of 0° are especially advantageous.

A drive for tilting a dichroic mirror relative to the first polarization manipulator can also be advantageous. The spectral region to be removed can be variably adjusted by tilting.

The invention also comprises a microscope having at least one filter device according to the invention as was described above. As was described above, especially advantageous embodiment forms are those in which the filter device is arranged as a beamsplitter, particularly as a main beamsplitter, and is traversed by light bidirectionally, particularly in that it is connected at a third input/output of the first polarizing beamsplitter to an illumination beam path comprising a light source, at a third input/output of the second polarizing beamsplitter to a detection beam path comprising a detector, and at a third output of the first polarizing beamsplitter to a common beam path comprising a microscope objective. Alternatively or in addition, it may be advantageous, as was described above, to arrange a filter device according to the invention as emission filter in a (simple) detection beam path.

DETAILED DESCRIPTION OF EMBODIMENTS

Figure 1:
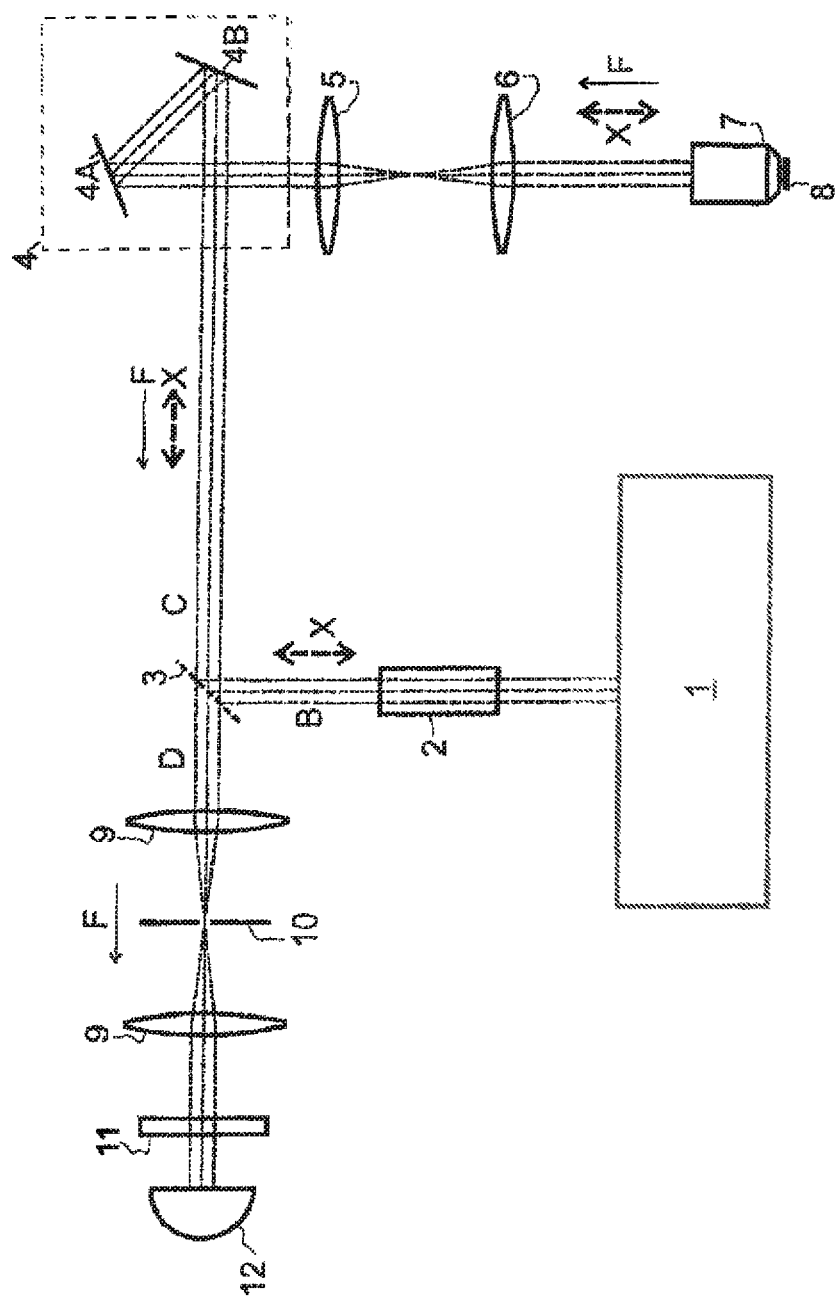
FIG. 1 shows a confocal fluorescence microscope according to the prior art.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

In the drawings, corresponding parts have the same reference numerals.

FIG. 1 shows an exemplary confocal scanning microscope with a spectrally broad-band laser as light source 1 in the illumination beam path B. By means of; e.g., an acousto-optical tunable filter 2 (AOTF) having a spectral filter function of a few nanometers bandwidth, the light generated by the laser 1 is preselected in desired first spectral ranges, the intensity of which is adjusted in addition by the level of the acoustic wave at the AOTF 2. The illumination light X arriving in the illumination beam path B in this way is reflected into the common beam path C (also known as fluorescence beam path or objective beam path) by means of a (static) notch filter as main color splitter 3. The variably adjustable deflecting unit 4 has, for example, galvanometer mirrors 4A/B and, in a known manner, scans the sample 8 to be analyzed with a focused light spot generated by the downstream lens arrangement comprising a so-called scanning objective 5, tube lens 6 and microscope objective 7.

Fluorescent light F emitted by the sample 8 and illumination light X reflected or scattered at the sample together pass through the microscope as sample light initially in reverse direction so that a stationary collimated beam path is present behind the (descanning) deflecting mirrors 4A/B. Any excitation light X contained therein is largely removed from the sample light beam when passing through the main color splitter 3 and is deflected to the light source 1. On the other hand, fluorescent light traverses the main color splitter 3 and is imaged in the detection beam path D through a 4f lens system 9, the confocal pinhole diaphragm 10 being positioned in the beam waist thereof. Any residual illumination light X remaining in the detection beam path is blocked in the simple detection beam path D by a notch filter acting as emission filter 11 in front of the detector 12. The notch filter can be optimized by tilting if necessary. However, as soon as a spectral filtering other than that corresponding to the notch filters 3 and 11 is adjusted at the AOTF 2 so that a different spectral emission line is emitted as illumination light X, the coupling of the illumination beam path B with the detection beam path D to form the common beam path C no longer functions because the main color splitter 3 releases the changed emission line through its unused input/output.

Figure 2:
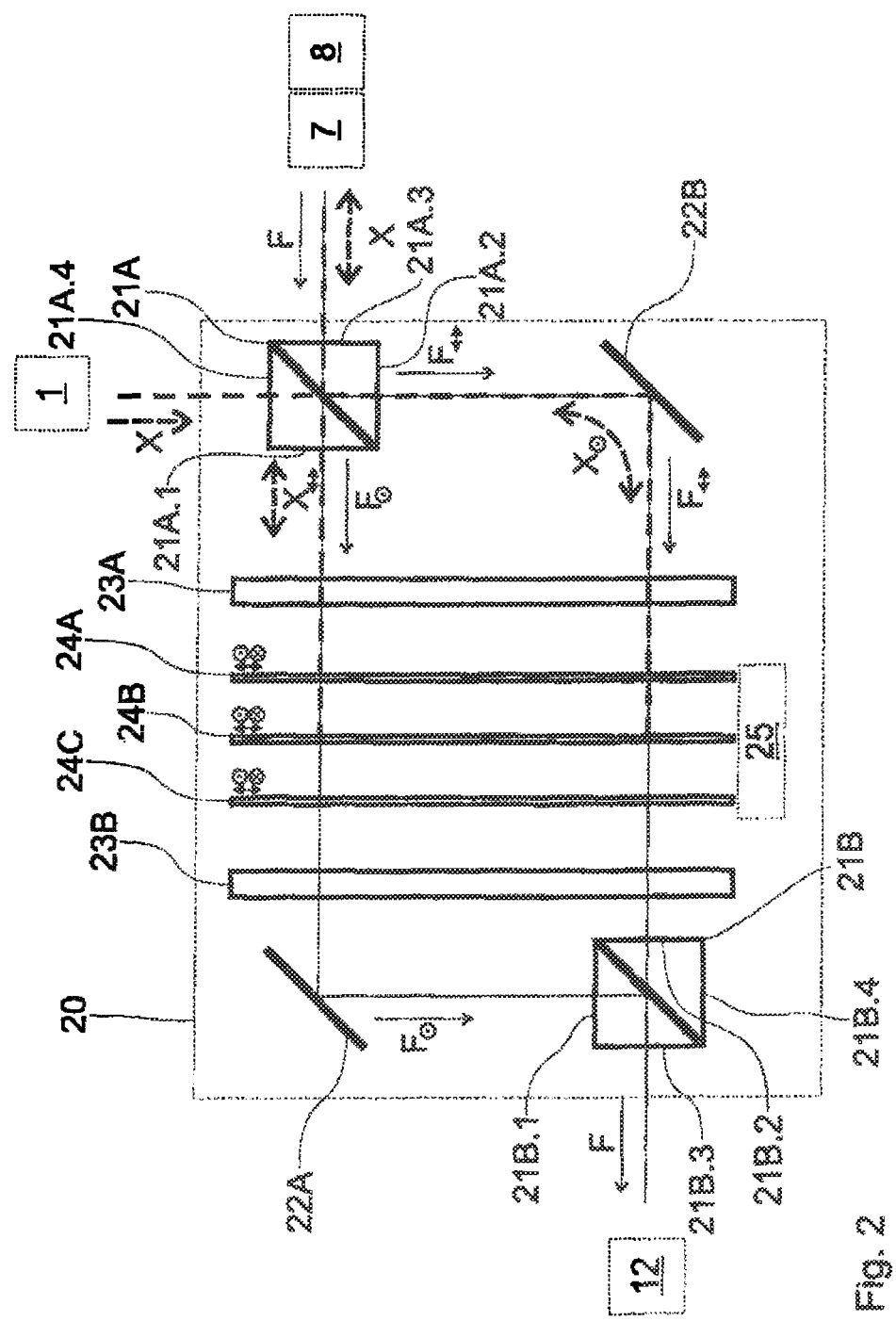
FIG. 2 shows a filter device which can be used in the microscope according to FIG. 1.

FIG. 2 shows a filter device 20 according to the invention which can be used, for example, in the microscope according to FIG. 1, as spectrally flexibly adjustable main color splitter 3 or as spectrally flexibly adjustable emission filter 11. In particular, it also allows a plurality of wavelength regions which are freely selected by means of the AOTF 2, particularly a plurality of emission lines, to be simultaneously coupled into the fluorescence beam path C as illumination light X.

The filter device 20 comprises a first polarizing beamsplitter 21A, a second polarizing beamsplitter 21B, deflecting mirrors 22A and 22B, an achromatic quarter-wave plate as first polarization modulator 23A, an achromatic quarter-wave plate as second polarization modulator 23B, and, for example, three spectrally different dichroic mirrors 24A, 24B and 24C as notch filters with continuously varying curve of the central wavelength of the notch along the mirror surface, for example, in that the thickness of the alternating dielectric layers of the interference filter varies over the substrate. In alternative embodiment forms, the curve can have discrete steps. In this case, within the drawing plane, the spectral transmission characteristic of all of the dichroic mirrors 24A/B/C is constant. The dichroic mirrors 24A, 24B and 24C are provided with a drive 25 which allows the dichroic mirrors 24A, 24B and 24C to be displaced independently from one another and accordingly allows a variable adjustment of the spectral position of the filter notch of each mirror 24A/B/C. The displacement can be carried out transverse to the optical axis in one or two dimensions, for example, into and out of the drawing plane and/or upward and downward in the drawing plane.

The illumination light X from the illumination beam path B (which is not part of the device 20) is directed through the first polarizing beamsplitter 22A into the device 20 so that one polarization component exits through the first input/output 22A.1 of the first polarizing beamsplitter 22A, traverses the first polarization modulator 23A in which its polarization state is altered so as to be "left circularly polarized", and then arrives at the first dichroic mirror 24A. The other polarization component traverses the first polarizing beamsplitter 22A, is deflected parallel to the first polarization component at the deflecting mirror 22B, traverses the second polarization modulator 23B in which its polarization state is altered so as to be "right circularly polarized", and then arrives at the first dichroic mirror 24B.

Spectral components of the illumination light X whose wavelengths lie in the spectral notch of the first dichroic mirror 24A are then reflected at the latter and again traverse the respective polarization modulator 23A/B, where their polarization state is changed so as to be "linearly polarized" but so as to be rotated by 90° relative to the initial state. Owing to the 90-degree rotation of the polarization direction resulting overall from the bidirectional passage, they exit the first polarizing beamsplitter 22A at the third input/output 22A.3 thereof. Light components whose wavelengths lie outside the spectral notch of the first dichroic mirror 24A traverse the dichroic mirror 24A virtually without attenuation. Corresponding selective reflections at the respective spectral notch take place at the second dichroic mirror 24B and third dichroic mirror 24C. Accordingly, when using as main color splitter 3, light with excitation wavelengths penetrates through the sequence of notch filters 24A-24B-24C until it impinges on a filter whose spectral characteristic is adjusted to the excitation wavelength. The respective spectral component is reflected at the respective filter to the sample 8.

Spectral components of the illumination light X lying spectrally outside of all of the spectral notches of the dichroic mirrors 24A/B/C are not reflected but finally traverse the second polarization modulator 23B in which their polarization state is changed so as to be "linearly polarized" but so as to be rotated by 90° relative to the initial state and are combined at the second polarizing beamsplitter 22B with the (not-reflected) remainder of the other polarization component. They exit the filter device 20 in direction of the fourth input/output 21B.4 of the second polarizing beamsplitter 21B but not into the detection beam path D.

The sample light (X+F) from the common objective beam path C is guided into the filter device 20 through the third input/output 21A.3 of the first polarizing beamsplitter 21A. Excitation light X which is backscattered from the sample 8 undergoes the above-described treatment in reverse sequence and is consequently deflected by the first polarizing beamsplitter 21A through the fourth input/output 21A.4 thereof in direction of the excitation light source 1. On the other hand, after the polarization splitting at the first polarizing beamsplitter 21A and after passing through the first quarter-wave plate 23A, fluorescent light F is not reflected at any of the notch filters 24A/B/C, so that the polarization state of the two fluorescence components is changed again to "linear", including a total rotation of 90°, through the second quarter-wave plate 23B. Accordingly, the two polarization components are combined at the second polarizing beamsplitter 21B to form a common beam and exit from the third input/output 21B.3 of the second polarizing beamsplitter 21B into the detection beam path D (not associated with the device 20) with detector 12.

The filter device 20 can be used as emission filter 11, for example, by substituting a switchable sequence of edge filters or bandpass filters (band stops) for the switchable sequence of notch filters.

Figure 3:
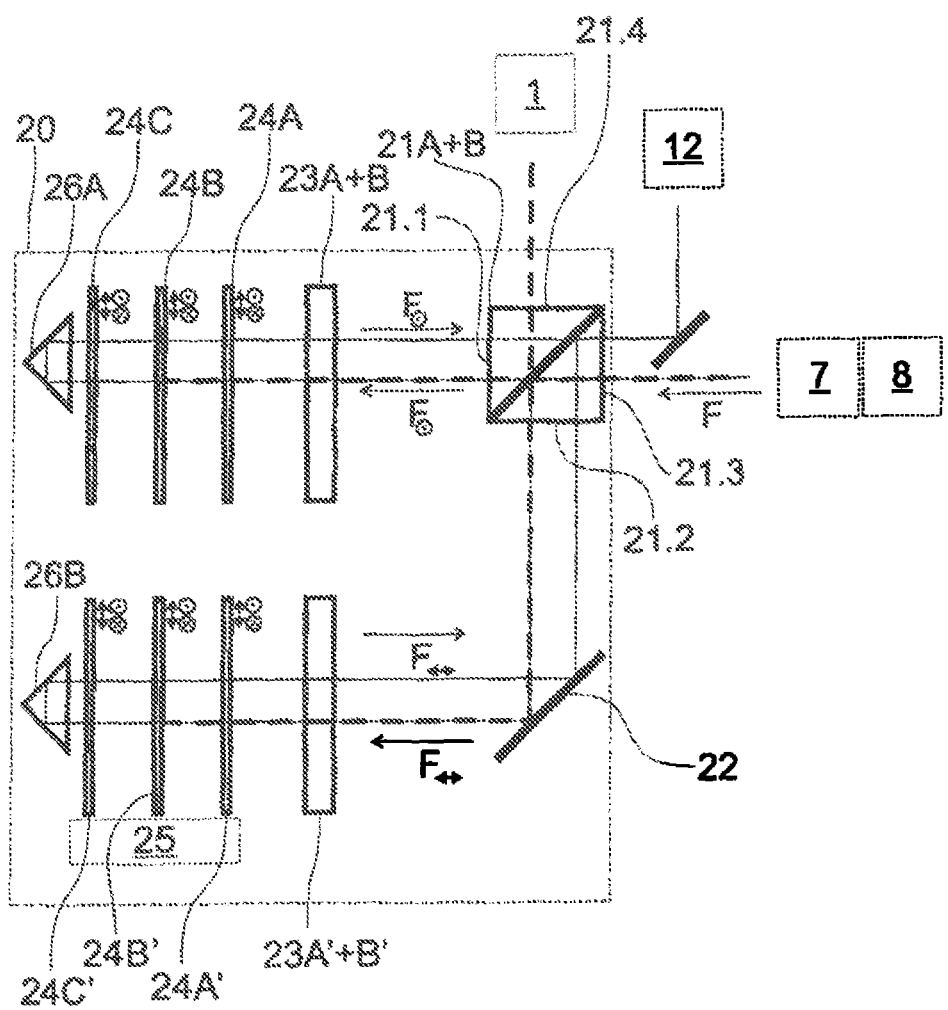
FIG. 3 shows an alternative filter device.

FIG. 3 shows a compact embodiment form with offset beam paths, for example, through prisms as separate reflectors 26. In addition, e.g., separate dichroic mirrors 24A/A', 24B/B' and 24C/C' and separate polarization modulators 23A+B and 23A'+B' are arranged in the polarization branches. All six of the dichroic mirrors 24A/A'/B/B'/C/C' can be displaced and/or tilted by means of drive 25.

Every embodiment form can be designed in a particularly compact manner in that a group composed of a polarizing beamsplitter 21A or 21B and the nearest deflecting mirror 22/22A/22B, also optionally including the nearest polarization modulator 23A or 23BB, is constructed monolithically, for example, by cementing these component parts.

The invention can be used in any type of microscope, particularly fluorescence microscopes. Use in confocal scanning microscopes with single-point scanning and with multipoint scanning or line-shaped scanning is particularly advantageous. Further, the invention can be used in any light source and in any optical measuring instrument for color filtration.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS 1 light source
2 adjustable filter
3 main color splitter
4 deflecting unit (galvanometer mirror 4A/B)
5 scanning objective
6 tube lens
7 microscope objective
8 sample
9 lens system
10 pinhole diaphragm
11 emission filter
12 detector
20 filter device
21A first polarizing beamsplitter
21B second polarizing beamsplitter
22(A/B) deflecting mirror
23A first polarization modulator
23B second polarization modulator
24A first dichroic mirror
24B second dichroic mirror
24C third dichroic mirror
25 drive
26(A/B) reflector X illumination light
F fluorescent light
X$_\odot$, X$_\leftrightarrow$ polarization components of the illumination light
F$_\odot$, F$_\leftrightarrow$ polarization components of the fluorescent light
B illumination beam path
D detection beam path
C common beam path

The invention claimed is:

1. An optical filter device comprising:
a first polarizing beamsplitter;
a first achromatic polarization modulator; and
a first dichroic mirror;
wherein the first polarization modulator is arranged optically between a first input/output of the first polarizing beamsplitter and the first dichroic mirror; and
wherein the first polarization modulator is constructed in such a way that it rotates by 90° a polarization direction of light which a) exits the first polarizing beamsplitter at the first input/output, b) traverses the first polarization modulator, c) is reflected by the first dichroic mirror, and d) again traverses the first polarization modulator.

2. The optical filter device according to claim 1, further comprising:
at least one second dichroic mirror;
wherein the first dichroic mirror is arranged optically between the second dichroic mirror and the first polarization modulator.

3. The optical filter device according to claim 1;
wherein the first dichroic mirror is formed as a notch filter, edge filter, or bandpass filter.

4. The optical filter device according to claim 1, further comprising:
a second polarizing beamsplitter; and
a second achromatic polarization modulator;
wherein the first dichroic mirror is arranged optically between the first polarization modulator and the second polarization modulator; and
wherein the first and second polarization modulators are arranged optically between the first input/output of the first polarizing beamsplitter and a first input/output of the second polarizing beamsplitter, so that light which a) exits from the first polarizing beamsplitter at the first input/output thereof and b) traverses both polarization modulators enters the second polarizing beamsplitter at a first input/output thereof.

5. The optical filter device according to claim 4, further comprising:
a third polarization modulator;
a fourth polarization modulator; and
a third dichroic mirror which is arranged optically between the third polarization modulator and the fourth polarization modulator;
wherein the third and fourth polarization modulators and the third dichroic mirror are arranged in such a way that light which a) exits from the first polarizing beamsplitter at a second output thereof, b) traverses the third polarization modulator, c) traverses the third dichroic mirror (24A') and d) traverses the fourth polarization modulator enters the second polarizing beamsplitter at a second input/output thereof.

6. The optical filter device according to claim 5;
wherein the first polarization modulator and the third polarization modulator are one and the same; or
wherein the first dichroic mirror and the third dichroic mirror are one and the same; or
wherein the first polarization modulator and the third polarization modulator are one and the same, and the first dichroic mirror and the third dichroic mirror are one and the same.

7. The optical filter device according to claim 4;
wherein the first polarizing beamsplitter and the second polarizing beamsplitter are one and the same, and every light beam that passes through the first polarization modulator and the second polarization modulator enters the polarizing beamsplitter so as to be offset relative to its immediately preceding exit therefrom.

8. The optical filter device according to claim 7;
wherein the first polarization modulator and the second polarization modulator are one and the same.

9. A microscope comprising:
at one optical filter device according to claim 4;
wherein the filter device is arranged as a beamsplitter, and is traversed by light bidirectionally; and
wherein the filter device is connected:
at a third input/output of the first polarizing beamsplitter to an illumination beam path comprising a light source;
at a third input/output of the second polarizing beamsplitter to a detection beam path comprising a detector; and
at the third input/output of the first polarizing beamsplitter to a common beam path comprising a microscope objective.

10. The microscope according to claim 9;
wherein the illumination beam path comprises a light source for the emission of a plurality of emission lines or a spectral region which is broader than an emission line.

11. The optical filter device according to claim 1, further comprising:
a drive which displaces the first dichroic mirror:
parallel to a surface of the first dichroic mirror and/or transverse to an optical axis of the first polarization modulator;
in two different directions perpendicular to one another; and
into a position such that light which a) exits from the first input/output of the first polarizing beamsplitter, and b) passes through the first polarization modulator, runs past the first dichroic mirror before the light impinges on another dichroic mirror or on the second polarization modulator.

12. The optical filter device according to claim 11;
wherein the displaceable first dichroic mirror has different spectral filter characteristics at different locations.

13. The optical filter device according to claim 1;
wherein the first dichroic mirror is arranged in such a way that light which a) exits from the first polarizing beamsplitter at the first input/output thereof and b) traverses the first polarization modulator impinges on the first dichroic mirror at an angle of incidence of 0°.

14. The optical filter device according to claim 1, further comprising:
a drive which tilts the first dichroic mirror relative to the first polarization modulator.

15. A microscope comprising:
at least one optical filter device according to claim 1.

16. The microscope according to claim 15;
wherein the optical filter device is arranged as emission filter in a detection beam path.

* * * * *